Figure 1:
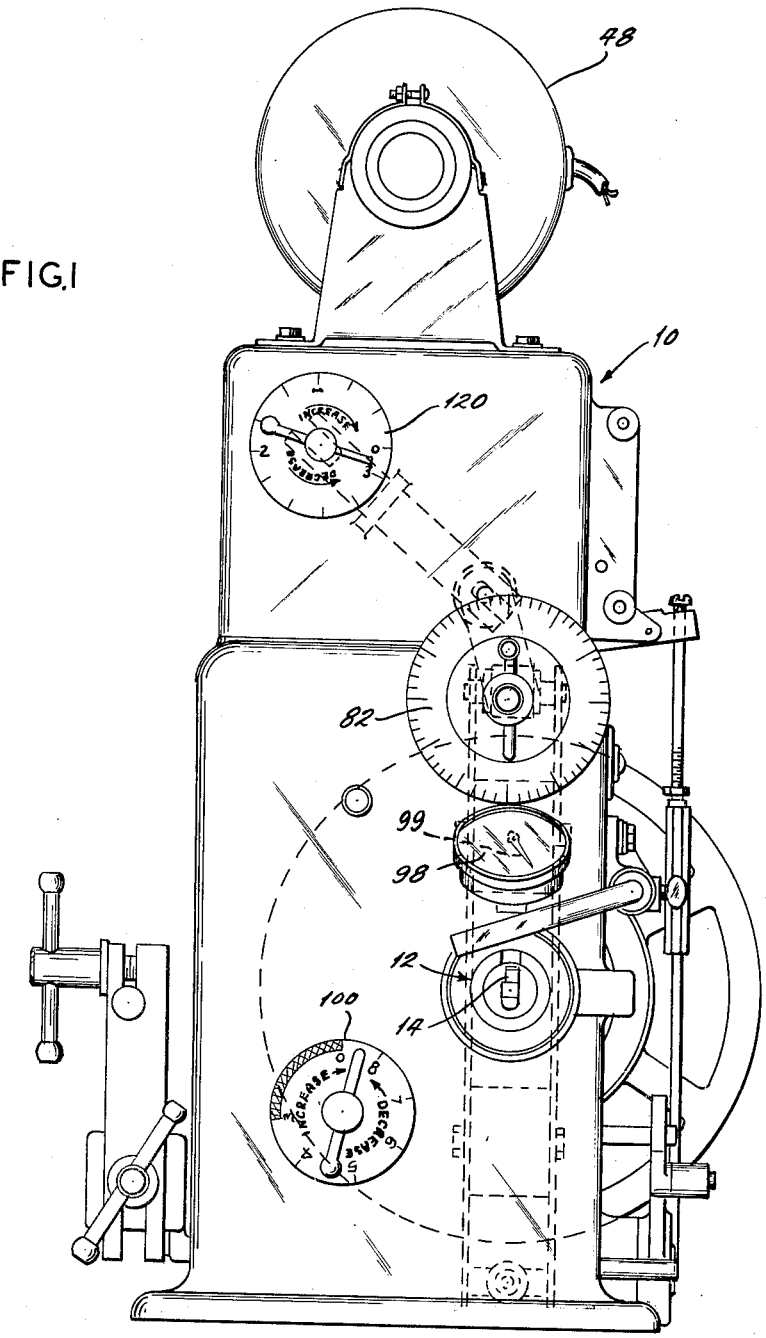

Oct. 13, 1964

J. SUNNEN 3,152,424

PRESSURE CONTROL MEANS FOR HONING MACHINES

Filed Aug. 1, 1963

2 Sheets-Sheet 1

INVENTOR:
JOSEPH SUNNEN
BY Charles B. Haverstock
ATTORNEY

INVENTOR:
JOSEPH SUNNEN
BY
Charles B. Haverstock
ATTORNEY

United States Patent Office 3,152,424
Patented Oct. 13, 1964

3,152,424
PRESSURE CONTROL MEANS FOR HONING MACHINES
Joseph Sunnen, 400 S. Warson Road, Clayton, Mo.
Filed Aug. 1, 1963, Ser. No. 299,311
10 Claims. (Cl. 51—72)

The present invention relates generally to pressure regulating and control devices and more particularly to control means for regulating the pressure applied by one member against another.

Many devices have been made and used heretofore for regulating and controlling the pressure applied by one member against another such as the pressure applied by a working member such as a honing, abrading or machining tool against a work piece. The known pressure regulating and control devices, however, are too inaccurate and unreliable for many applications. This is particularly true in the relatively light pressure ranges which are becoming increasingly more important as stricter tolerance requirements are demanded. So far as known, no one heretofore has devised a control which extends the range of pressures available for honing and machining operations and which is accurate and adjustable over the full operating range thereof including the relatively light as well as the relatively heavy pressure ranges.

These and other disadvantages and shortcomings of known devices are overcome by the present invention which teaches the construction and operation of novel pressure adjusting and regulating means for honing and machining tools and the like comprising a machine having a work engaging element thereon, means for applying pressure on the work engaging element against a work piece, means for adjusting and regulating the applied pressure including first means operatively engageable with the work engaging element and capable of producing an applied pressure within a first preselected pressure range, and second means independently engageable with the work engaging element and capable of producing an applied pressure within a different preselected pressure range, and separate means for adjusting the second means to change the pressure applied by the work engaging element against the work piece.

It is a main object and purpose of the present invention to teach the construction and operation of improved means for extending the range of pressures applied by one member against another member.

Another object is to increase the range of operating pressures available in honing and machining tools and the like.

Another object is to provide means to enable machines such as honing machines and the like to operate accurately even at relatively light operating pressures.

Another object is to increase the accuracy of honing, abrading and other machine tools.

Another object is to provide relatively simple and inexpensive means for extending the range of operating pressures available from honing and machining tools and the like.

Another object is to provide means for relatively easily converting existing honing and machining devices and the like to increase the operating pressure ranges and the accuracy thereof without requiring any increase in operator skill.

Figure 2:
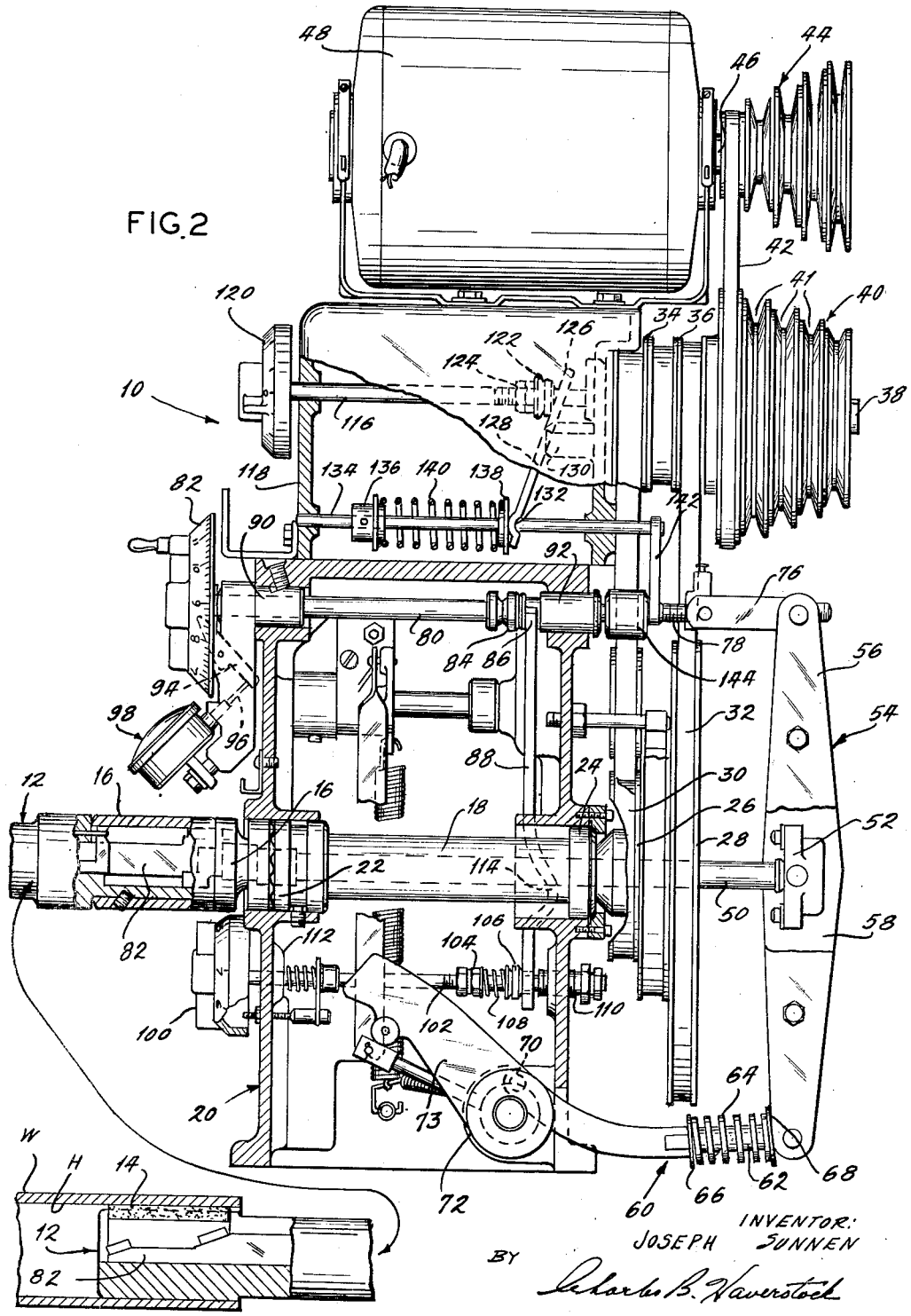

These and other objects and advantages of the present invention will become apparent after considering the following detailed specification of a preferred embodiment thereof in conjunction with the accompanying drawings, wherein:

FIG. 1 is a front view of a machine provided with pressure regulating means constructed according to the present invention; and FIG. 2 is a side elevational view, mostly in section, of the same machine.

Referring to the drawings by reference numbers, the number 10 refers to a machine such as a honing machine, provided with pressure regulating means constructed according to the present invention. Honing machines of the same general type shown in the drawings have been in use for many years as disclosed by Sunnen Patents Nos. 2,070,381; 2,117,525 and 2,349,526. The existing machines are very satisfactory for most purposes but are limited as to their range of operating pressures and for this and other reasons are unable to achieve the accuracy and precision required for some applications. To a large extent, these inadequacies are due to the fact that the existing machines are unable to operate accurately and precisely in the relatively low pressure ranges.

Industry is constantly striving for more precision and closer manufacturing tolerances particularly in honed and machined articles. This trend is particularly true of honing and machining operations designed to form, grind and finish surfaces of work pieces such as the cylindrical surfaces of holes and bores. At the time of this writing, for example, there are many applications which require tolerance accuracies to within a few millionths of an inch or less, and to produce parts having surfaces that are accurate to these strict tolerance requirements requires equipment capable of being extremely accurately controlled especially as to their operating pressures. This is especially true of the relatively low operating pressure ranges. It has not been possible to obtain this precise control with existing machines because of the limited range of pressures available. Furthermore, it has not been possible to sufficiently expand the range of operating pressures by modifying existing pressure producing means. This has been largely due to the fact that the operating pressures available in existing machines are mostly in the relatively heavy pressure ranges and the means employed to produce these pressures simply are not versatile or adaptable for expansion outside of their intended pressure ranges. It is therefore a main purpose of the present invention to expand the range of operating pressures available for honing and machining devices in order to satisfy the stricter tolerance requirements. It is not intended, however, to limit the present invention to honing and machining equipment since it has applications in many other areas where greater operating pressure ranges are needed.

Referring to FIG. 2, a work piece W with a cylindrical bore or hole H therethrough is shown operatively receiving a honing mandrel 12. The mandrel 12 is rotated in the hole H by means on the machine 10 and the mandrel 12 has means thereon to grind or hone the hole surface to a desired size and smoothness in one or more honing operations. The actual honing is accomplished by one or more honing stones or stone elements 14 mounted for radial movement on the mandrel. Many different mandrel constructions and stone moving means are available and can be used on the subject machine 10, and it is not intended to limit the subject invention to any particular mandrel. The mandrel may also have wear elements or shoes positioned thereon to engage the hole substantially opposite from the honing stone to provide backing support therefor during honing.

The mandrel 12 is mounted in a holder or adaptor 16 on the forward end of the tubular rotatable shaft 18. The shaft 18 extends through the machine and is journaled to the machine housing 20 by bearing assemblies 22 and 24. The shaft 18 also extends rearwardly from the machine housing, and the rear end portion of the shaft carries a pair of driven pulleys 26 and 28 which are engageable respectively with drive belts 30 and 32. The drive belts 30 and 32 are also engageable with other pulleys 34 and 36, respectively, which are mounted on another shaft 38 rotatably supported on the housing thereabove. The shaft 38 also carries a multi-position pulley 40 which has a plurality of V-shaped grooves 41 for cooperation with a V-belt 42. Any one of the grooves in the multi-position pulley 40 can be engaged by the V-belt 42, and the V-belt also engages a corresponding groove in another multi-position pulley 44 located on a motor shaft 46 of drive motor 48. Means are provided for selectively individually applying tension to the belts 30 and 32 to make the machine operate at a desired speed. The means for changing speed are covered by co-pending Sunnen patent application Serial No. 272,655, filed April 12, 1963. It is sufficient for this disclosure to note that when tension is applied to the belt 30 the shaft 18 and the mandrel 12 will rotate at a relatively high operating speed, and when the belt 32 is tensioned, and the belt 30 relaxed, the mandrel 12 will operate at relatively slow speed. Changing the position of the V-belt 42 in the multi-position pulleys 40 and 44 provides additional speed adjustment.

Another shaft 50 extends lengthwise through the center of shaft 18 and has its rear end mounted for rotation in a thrust bearing assembly 52. The thrust bearing assembly 52 is centrally located and supported by a feed arm assembly 54 which includes a pair of spaced vertical members 56 and 58 connected at their lower ends to an operator assembly 60. The operator assembly 60 includes a member 62 pivotally connected to the lower ends of the members 56 and 58, an overload spring 64 positioned on the member 62, and a pair of spaced collars or flanges 66 and 68 between which the overload spring 64 is compressed. The overload spring 64 is provided to prevent accidental damage to the machine parts under certain conditions not directly related to the present invention. The operator assembly 60 is also connected to an eccentric pin 70 on a rotatable mechanism 72 which has another arm 73 connected by suitable lever means, not shown, to a foot pedal also not shown. The foot pedal is depressed to operate the machine in a well known manner also not directly related to the present invention.

The upper ends of the vertical members 56 and 58 are connected together by another member 76 which has a threaded passage therethrough that cooperates with a threaded end portion 78 of a rod 80. The rod 80 extends forwardly through the machine housing 20 and the forward end of the rod 80 has a feed-up knob 82 attached thereto. When the feed-up knob 82 is rotated it rotates the rod 80 in the member 76 and this changes the position of the upper end of the feed arm assembly 54 relative to the lower end thereof. When the knob 82 is rotated in one direction the upper end of the feed arm assembly 54 moves forwardly (to the left in FIG. 2) also moving the shaft 50 forwardly in the shaft 18 but only half the distance. This in turn moves a wedge assembly 82 positioned in the mandrel forwardly and moves the honing stone assembly 14 outwardly into engagement with the surface of the hole H.

The rod 80 extends through a slot or opening in an upper portion 86 of a relatively heavy flat spring member or lever 88. The rod 80 also fixedly carries a collar 84 which is positioned at an intermediate location thereon adjacent to the upper end portion 86 of the lever 88. When the knob 82 is rotated so as to thread the rod portion 78 rearwardly into the member 76 the upper end of the assembly 54 moves forwardly and in so doing advances the rod 50 and the wedge assembly 82 in a direction to move the stone 14 outwardly into engagement with the hole H.

Thereafter, further rotation of the feed-up knob 82 in the same direction cannot expand the honing stone 14 further and the assembly 54 will remain fixed. However, the additional rotation will cause the rod 80 to move rearwardly (to the right in FIG. 2) in its associated bearing members 90 and 92. This occurs either after the collar 84 is engaged with the upper end 86 of the spring member 88 or in the alternative when the light pressure control means are employed as will be described hereinafter. The further turning of the knob 82 will develop honing pressure as will be shown hereinafter.

The rod member 80 and the knob 82 are allowed to slide rearwardly by a predetermined amount after the stone engages the hole. This additional rearward movement of the knob 82, in addition to loading the spring 88 or other means, also pivots an operator member 94 which moves another operator member 96 that is part of a honing dial 98. The honing dial 98 has a needle 99 mounted therein which rotates as the knob 82 is turned beyond the point where the stone engages the work to provide a visual reading as to the amount of stone travel available for each different setting of the knob 82. The needle 99 is set to a particular stone travel setting, and the dial 98 provides a continuous but decreasing reading of the stone travel during a honing operation. In other words, the dial reading will continuously decrease during a honing operation as material is removed from the hole until at the completion of the operation the needle 99 will be at or near a zero reading position.

During a honing operation it is important not only to be able to regulate the amount of stone travel but to regulate the pressure applied by the stone against the work piece. It is in this latter regard that the present invention has its most important and novel aspects. As already mentioned, the present invention includes means for producing relatively heavy and relatively light honing pressures and the two honing pressure ranges are preferably adjacent or somewhat overlapping to provide full range of possible operating pressures. In the case of the heavy cutting pressure control, the pressure is adjusted by a heavy cutting pressure control knob 100 which is mounted on the forward end of a shaft 102 located relatively near to the bottom of the machine. The shaft 102 carries a fixed collar 104 which may be in the form of an adjustable lock nut and a slidable collar 106 spaced therefrom. A relatively heavy coil spring 108 is positioned between the collars 104 and 106, and the collar 106 is positioned to engage a lower end portion of the heavy flat spring member 88 as shown in FIG. 2. The collar 106 may have a spherical ball seat on the side that engages the spring 88, and the spring will then have a complementary socket therefor. The rearward end of the rod 102 is threadedly engaged with a member 110 attached to the housing 20, and the forward end of the rod 102 is slidable in a bearing member 112. When the knob 100 is rotated so as to move the collars 104 and 106 rearwardly, the collar 106 will move against the lower end of the member 88. As the knob 100 is rotated further, the spring 108 will be compressed between the collars 104 and 106, and the flat spring 88 which is formed with a central bowed portion 114 that engages the rear wall of the housing 20, will be rotated about the bowed portion 114 and loaded. In so doing, the spring lever 88 will also apply forward pressure against the collar 84 and the shaft 80. It can therefore be seen that the honing pressure will be increased when the knob 100 is rotated in a direction to apply greater rearward pressure against the lower end of the spring member 88 and this pressure can be increased or decreased simply by changing the setting of the knob 100.

The cutting pressures produced by the springs 88 and 108 are applied in a direction to move the upper end of the feed arm assembly 54 forwardly in a direction to advance the honing stones radially outward against the work piece. The pressures produced by the springs 88 and 108 are in a relatively heavy pressure range and it has not been possible to accurately and reliably expand or increase the range of these pressures to cover relatively light pressures required to hone to extremely precise tolerances. On the other hand, the above described springs are accurate and reliable above a predetermined minimum pressure.

It is therefore a main purpose of the present invention to provide means for providing accurate cutting pressures in the range extending downwardly from the aforesaid minimum pressure obtainable with the springs and other means already described. In order to be accurate in the low pressure ranges, however, it is necessary that the heavy cutting pressure control knob 100 be turned to its minimum or zero setting position so that the heavy pressure producing means do not affect the light pressure control means. It is also necessary when adjusting the honing in the light pressure range to adjust the feed-up knob 82 in the manner described above in order to preset the desired amount of stone movement. This is done using the dial 98 to provide a visual indication of the amount of feed-up.

The fine or light cutting pressure control means include a shaft 116 which extends through an auxiliary housing portion 118 mounted on top of the main housing 20. The front end of the shaft 116 carries a fine or light cutting pressure control knob 120, and the shaft 116 also fixedly carries an adjustment member 122 which is held in position thereon by a lock nut 124. The member 122, like the member 106, has a spherical ball seat which cooperates with a complementary seat in a lever member which will be described later. The shaft 116 is mounted in the housing portion 118 similar to the mounting of the shaft 102 so that when the knob 120 is rotated the shaft will move longitudinally. This longitudinal movement will move the member 122 against a seat near the end 126 of a lever member 128 which is pivotally engaged at an intermediate location with a fixed pivot member 130 attached to the rear wall of the housing 118. The member 128 is relatively unbendable and is used more as a lever than a spring. The opposite end of the member 128, at 132, is formed to cooperatively receive a shaft member 134 therethrough. The shaft member 134 has a fixed collar 136 located thereon and another collar 138 which is slidable thereon and spaced from the fixed collar 136. A coil spring 140 is positioned between the collars 136 and 138 as shown in FIG. 2 and can be compressed by adjusting the knob 120 to produce any desired honing pressure within the range thereof as will be shown.

The shaft 134 is longitudinally slidable in suitable bearings or holes in the housing portion 118, and the rear end of the shaft 134 carries a forked member 142 which extends downwardly therefrom and embraces the rod 80. The forked member 142 also engages an enlarged member 144 which is fixedly attached to the rod 80. It can now be seen that when the light cutting pressure control knob 120 is rotated to move the beveled member 122 rearwardly, the lever 128 will pivot on the member 130 and produce an amplified movement of the slidable collar 138. This in turn will compress the spring 140 and apply forward pressure against the fixed collar 136 to move the rod 134 forwardly in the machine. This forward movement will move the forked member 142 against the enlarged member 144 and apply forward pressure on the upper end of the feed arm assembly 54. This pressure is applied in a direction to move the shaft 50 forwardly and hence to move the stone 14 outwardly against the work piece with predetermined force. The force with which the stone engages the hole is therefore dependent on the force of spring 140 only. It has been found that by proper selection of the size and strength of the spring 140 the knob 120 can be made to accurately produce almost any honing pressure within a range extending from zero pressure up to and even beyond the minimum pressure that can be applied accurately using the heavy cutting pressure control knob 100. This therefore extends the range of honing pressures downwardly to cover a full operating range. The light cutting pressure control knob 120 can be adjusted to accurately produce any honing pressure within the range thereof.

In FIG. 1 the heavy cutting pressure control knob 100 is shown calibrated with a scale of accurate setting positions covering a range from approximately three to approximately eight. The portion of the scale between zero and the three reading is cross-hatched and should not be used. It is in this cross-hatched range that the light cutting pressure control knob 120 is accurate and should be used. The light cutting pressure control knob 120 is therefore shown calibrated from a minimum reading of zero to a maximum reading slightly in excess of three. This therefore covers the cross-hatched range on the knob 100. Within their respective ranges the knobs 100 and 120 are extremely accurate and reliable. The two knobs therefore cover the full range of honing pressures from zero to the maximum pressure obtainable from the combined springs 88 and 108.

By providing two separate cutting pressure controls it is possible, not only to obtain greater accuracy, but also to speed up honing operations by using the controls for different purposes thereby making the machine more efficient and more versatile. The heavy cutting pressure control, for example, can be used for roughing and stock removal operations, and the light cutting pressure control can be used for honing in small hole sizes and can be used for finishing and smoothing operations.

The present invention also has application to many devices other than the particular honing machine disclosed herein, and it is not intended to limit it to the particular applications shown and described. For example, it can be used on many different types of machine tools where it is desired to be able to provide more accurate and more extended operating pressure control means.

Thus there has been shown and described novel pressure control means which fulfill all of the objects and advantages sought therefor. Many changes, variations, modifications and other uses and applications of the subject means, however, will become apparent to those skilled in the art after considering this specification and the accompanying drawings which show and describe a preferred embodiment of the device. All such changes, variations, modifications and other uses and applications which do not depart from the spirit and scope of the invention are deemed to be covered by the invention which is limited only by the claims which follow.

What is claimed is:

1. Means for adjusting the operating pressure applied by a working member on a work piece comprising a work member capable of removing stock from a work piece during operation thereof, means for removing the working member into operative engagement with the work piece, means adjustable to allow the working member to move a predetermined distance to remove a predetermined amount of stock from the work piece during operation thereof, first means for adjusting the pressure applied by the working member against the work piece, said first means including spring means capable of producing an operating pressure within a first predetermined range of pressures, and second means independent of the aforesaid first means operatively connected to the working member, said second means including means for adjusting the operating pressure applied by the working member against the work piece in a range different from the range covered by the aforesaid first means.

2. The pressure adjusting means defined in claim 1 wherein said working member is an expandable honing mandrel and the work piece is a member having a bore therein to be honed by the mandrel.

3. The pressure adjusting means defined in claim 2 wherein said mandrel includes a honing element and operator means for moving the honing element radially outward on the mandrel into engagement with the bore in the work piece, and said second pressure adjusting means includes a spring operatively engaged with the operator means, and means for predeterminately loading said spring in a direction to apply predetermined operating pressure by the honing stone against the bore to be honed.

4. Pressure control means for adjusting the operating pressure of honing machines and the like comprising a honing machine having a rotatable mandrel including a honing stone mounted thereon, means for rotating the mandrel, and other means for moving the stone radially outwardly on the mandrel into engagement with a work piece to be honed, said last named means including feed-up means on the honing machine for adjusting the amount of stone movement for a particular honing operation, and means for adjusting the pressure applied by the honing stone against a work piece during a honing operation, said last named means including first adjustment means including first spring means operatively engageable with the honing stone and capable of spring loading the stone in a direction to apply honing pressure within a first range against the work piece during operation thereof, means for selectively adjusting or releasing the pressure applied on the stone by said first adjusting means, and other pressure applying means operatively engageable with the honing stone independent of the aforesaid first pressure adjusting means, said other pressure applying means including second spring means capable of producing honing pressures in a range different from the first range available from said first spring means.

5. The pressure control means defined in claim 4 wherein said first pressure adjustment means includes indicator means calibrated to directly indicate the operating pressure applied by the stone against the work piece due to the first spring means.

6. The pressure control means defined in claim 4 wherein said other pressure applying means includes separate indicator means to directly indicate the operating pressure applied by the stone against the work piece due to the second spring means, said separate indicator being calibrated to accurately indicate the pressure applied by the second spring means when the pressure on the first spring means is released.

7. The pressure control means defined in claim 4 wherein said first spring means covers a range of operating pressures greater than the range of operating pressures available from said second spring means.

8. The pressure control means defined in claim 4 wherein means are provided to amplify the loading of the second spring means to provide more accurate adjustment of the operating pressures available therefrom.

9. The pressure control means defined in claim 4 wherein said first spring means includes the combination of a coil spring and a leaf spring, said leaf spring amplifying the loading produced by the coil spring to provide more accurate adjustment of the operating pressure within the range thereof.

10. Means for applying pressure against a work piece by a work member comprising a work piece, a work member movable into engagement with the work piece, means for adjusting the travel of the work member during operation thereof, and means for adjusting the pressure applied by the work member against the work piece including a first pressure control means including a first pressure control knob and associated spring means operatively engageable with the work member and capable of being adjusted to produce any operating pressure of the work member against the work within a first predetermined pressure range, and a second pressure control knob and associated second spring means operatively engageable with the work member and capable of producing any desired operating pressure in a second pressure range different from the first pressure range, said second pressure control knob and second spring means being selectively adjustable to predeterminately load said work member independently of said first pressure control knob and associated spring.

References Cited in the file of this patent
UNITED STATES PATENTS

| | | |
|---|---|---|
| 2,070,381 | Sunnen | Feb. 9, 1937 |
| 2,155,072 | Zimmerman | Apr. 18, 1939 |
| 2,483,590 | Michell | Oct. 4, 1949 |

UNITED STATES PATENT OFFICE
CERTIFICATE OF CORRECTION

Patent No. 3,152,424                    October 13, 1964

Joseph Sunnen

It is hereby certified that error appears in the above numbered patent requiring correction and that the said Letters Patent should read as corrected below.

Column 6, line 51, for "removing" read -- moving --; column 8, line 40, for "Michell" read -- Mitchell --.

Signed and sealed this 6th day of April 1965.

(SEAL)
Attest:

ERNEST W. SWIDER
Attesting Officer

EDWARD J. BRENNER
Commissioner of Patents